May 23, 1961 W. E. WHITE 2,985,260
DOUBLE BRAKE ASSEMBLY
Filed July 19, 1957 6 Sheets-Sheet 4
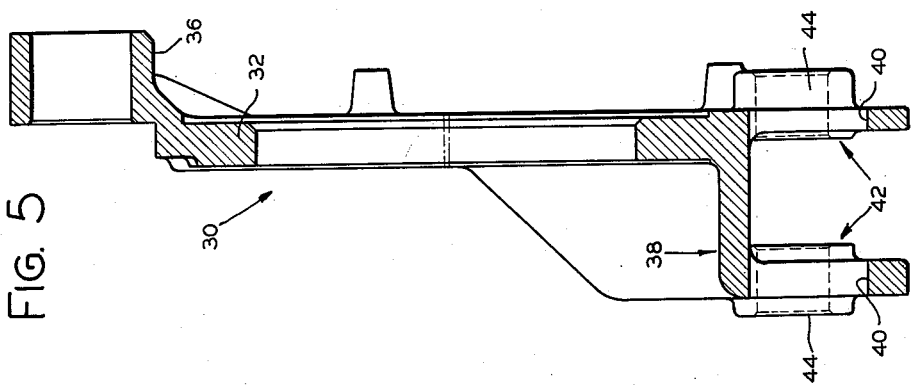
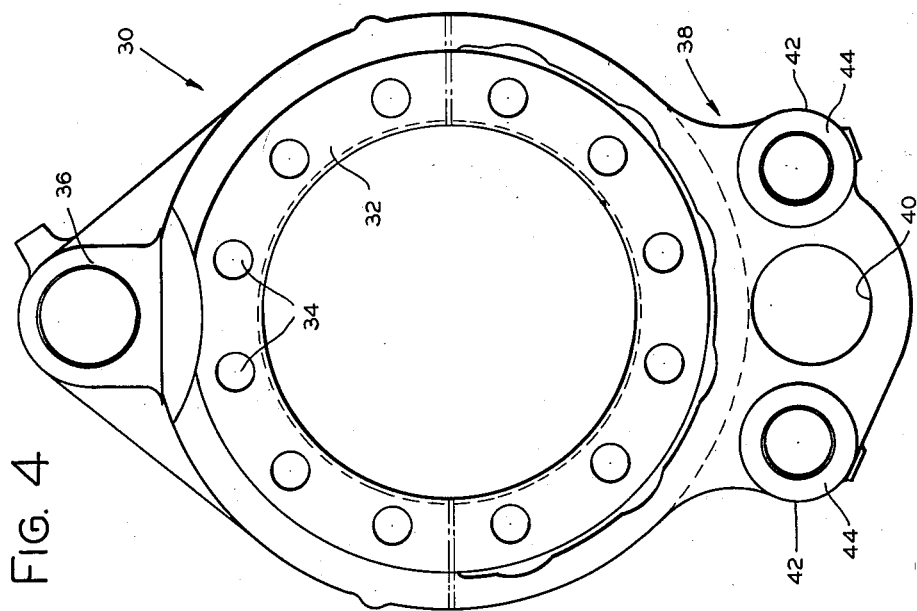
INVENTOR.
WILLIAM E. WHITE
BY
ATTYS.

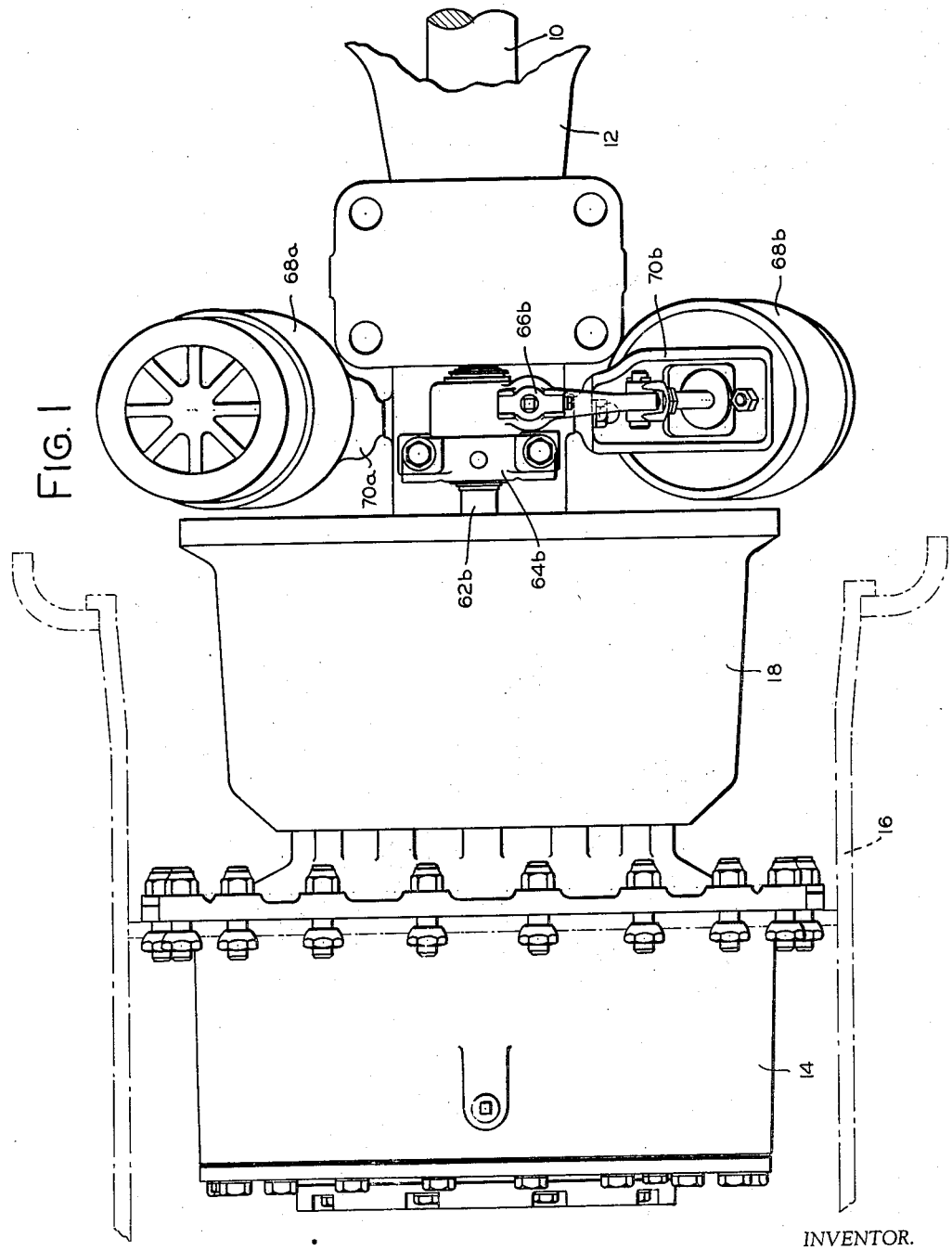

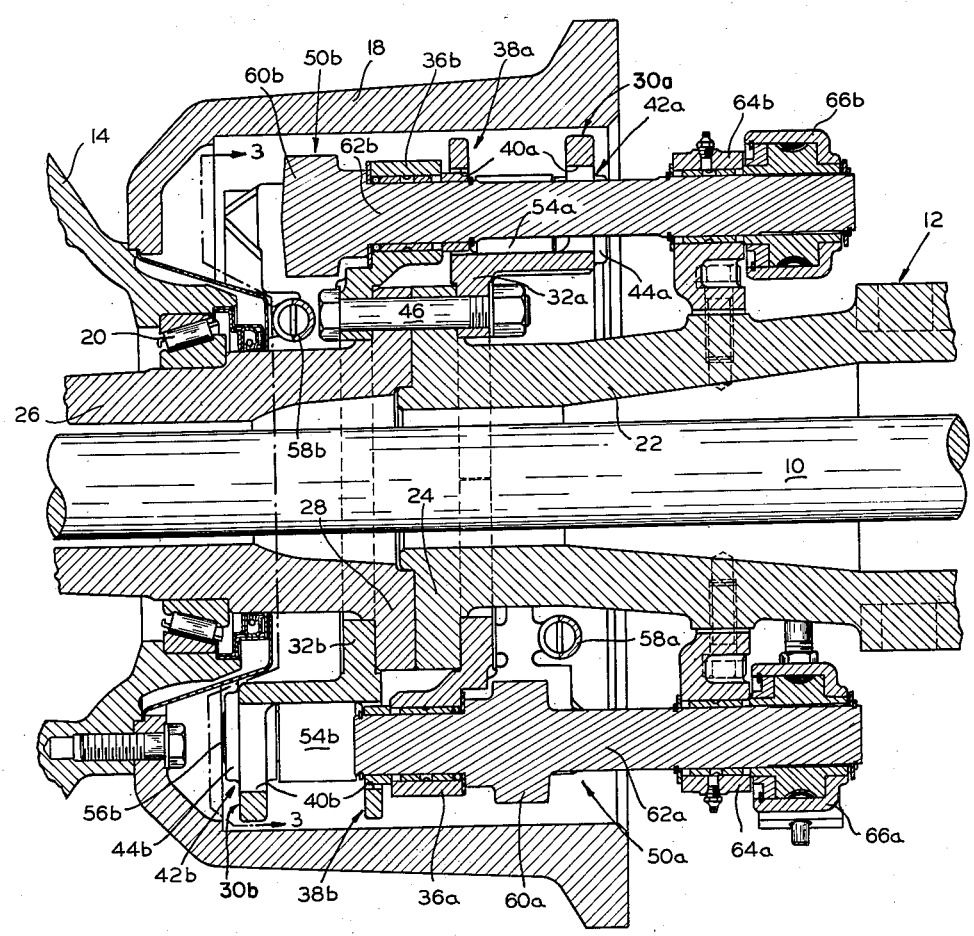

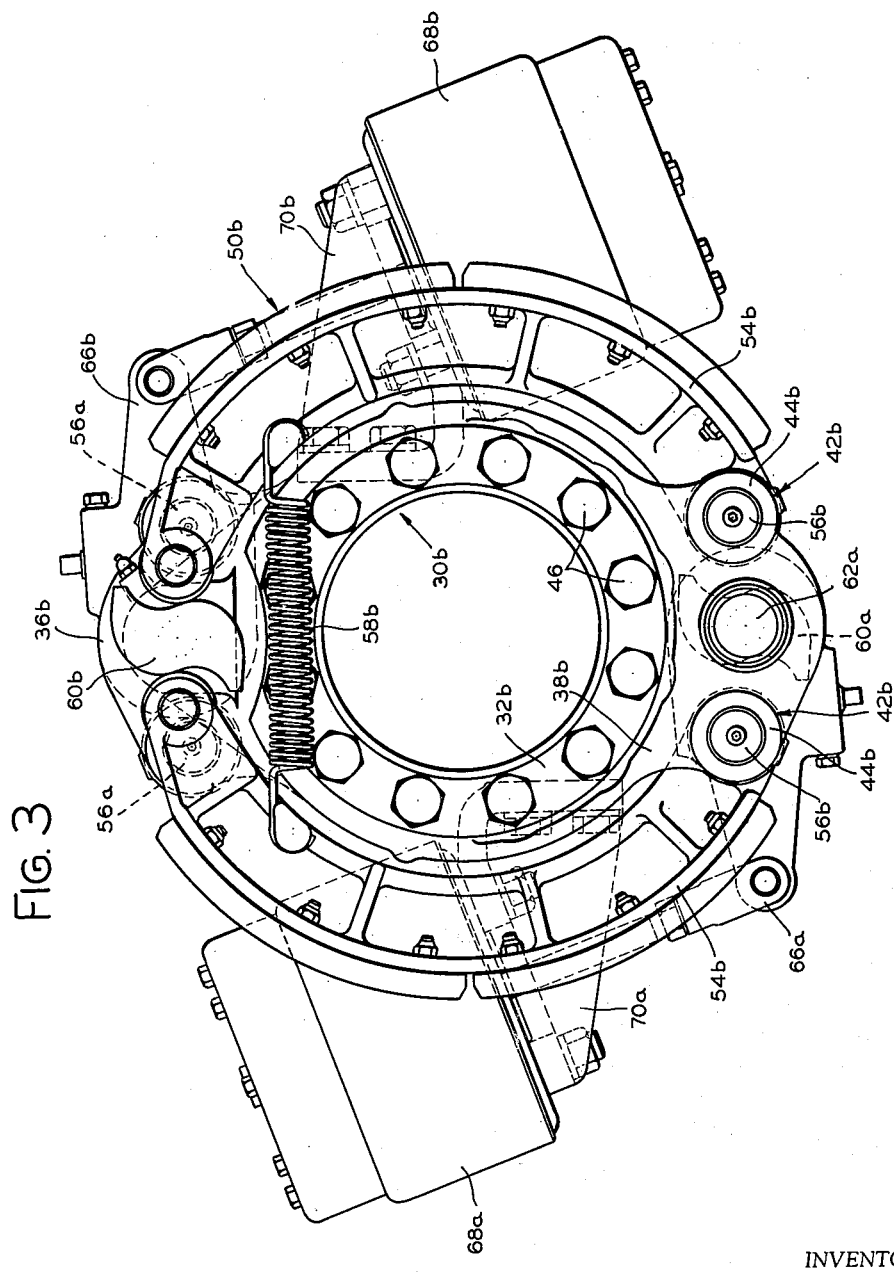

May 23, 1961

W. E. WHITE 2,985,260

DOUBLE BRAKE ASSEMBLY

Filed July 19, 1957

INVENTOR.
WILLIAM E. WHITE
BY
ATTYS.

United States Patent Office 2,985,260
Patented May 23, 1961

1

2,985,260

DOUBLE BRAKE ASSEMBLY

William E. White, Buchanan, Mich., assignor to Clark Equipment Company, a corporation of Michigan Filed July 19, 1957, Ser. No. 673,087

8 Claims. (Cl. 188—79)

The present invention relates to brake mechanisms, and particularly, to an improved brake assembly for heavy duty trucks, tractors and like equipment including two sets of brakes for each vehicle wheel.

Double brake assemblies have previously been proposed in the art and comprise, essentially, two sets of brake shoes acting on the same brake drum. By virtue of this arrangement, the area of the braking surface is twice that which would exist in a single brake assembly of comparable size, whereby, for a given braking effect, the diameter of the brakes may be substantially decreased. The particular advantage afforded is a substantial decrease in the diameter of the costly brake drum. In addition, it has previously been proposed to actuate each brake set independently, thereby to obtain maximum braking effort with a minimum power input per brake set and a minimum brake diameter.

The object of the present invention is to provide improvements in and relating to double brake assemblies, particularly those of the last described type.

Specifically, it is an object of the invention to provide an improved double brake assembly of compact, economical construction characterized principally by improved means for mounting the brake sets.

Another object of the invention is the provision of improved mounting means for double brake assemblies comprising improved spider means for anchoring each set of brake shoes and rotatably mounting the actuators therefor.

A further object of the invention is the provision of improved double brake set mounting means comprising a pair of identical spiders mounted adjacent and in inverted relation to one another, each spider respectively anchoring one set of brake shoes and rotatably mounting the actuator therefor.

Other objects and advantages of the invention will become apparent from the following detailed description of preferred embodiments of the invention.

Now, in order to acquaint those skilled in the art with the manner of making and using the improved double brake assembly of my invention, I shall describe, in connection with the accompanying drawings, preferred embodiments of said assembly and preferred manners of making the same.

In the drawings:

Figure 1 is a plan view of one end of a vehicle drive axle, the view showing the axle, the axle housing, the wheel hub and rim and the brake drum;

Figure 2 is an enlarged fragmentary vertical section of the axle assembly, the view showing the improved brake means embodied according to the present invention in the axle assembly;

Figure 3 is an end view of my improved double brake assembly, the view being taken substantially on line 3—3 of Figure 2 and omitting the axle, axle housing and brake drums;

Figure 4 is a front elevation of one of the spiders provided according to the present invention;

2

Figure 6:
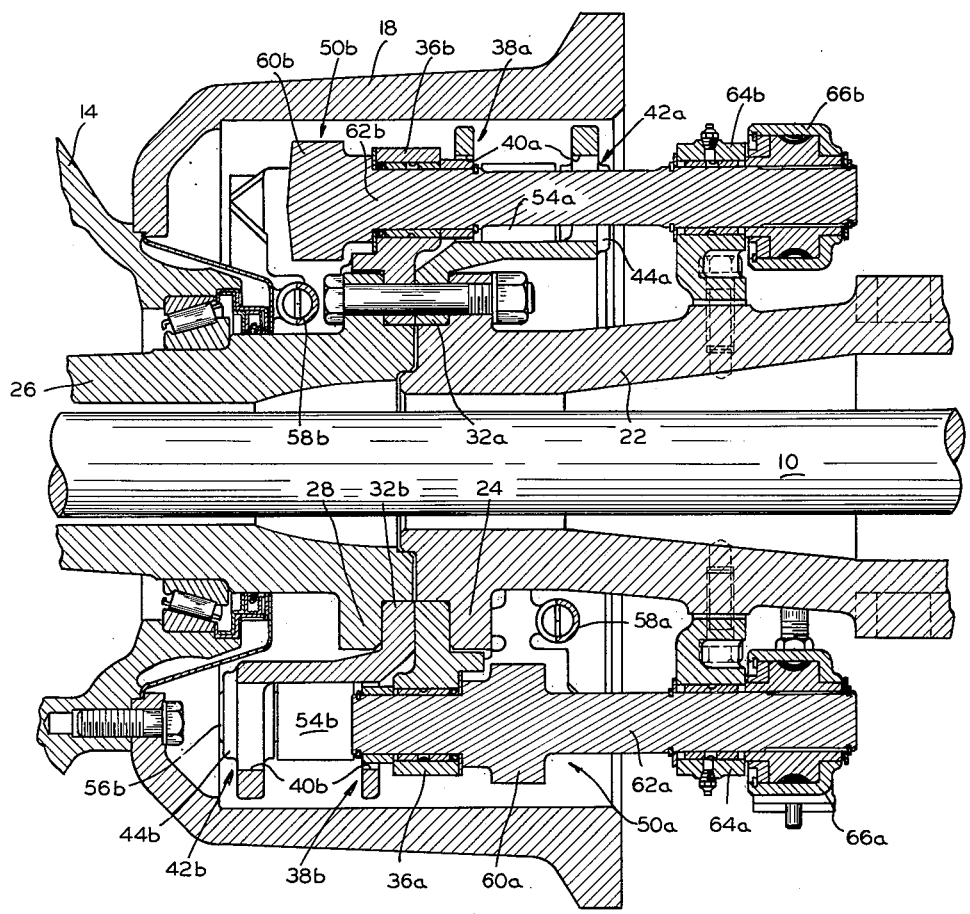
Figure 7:
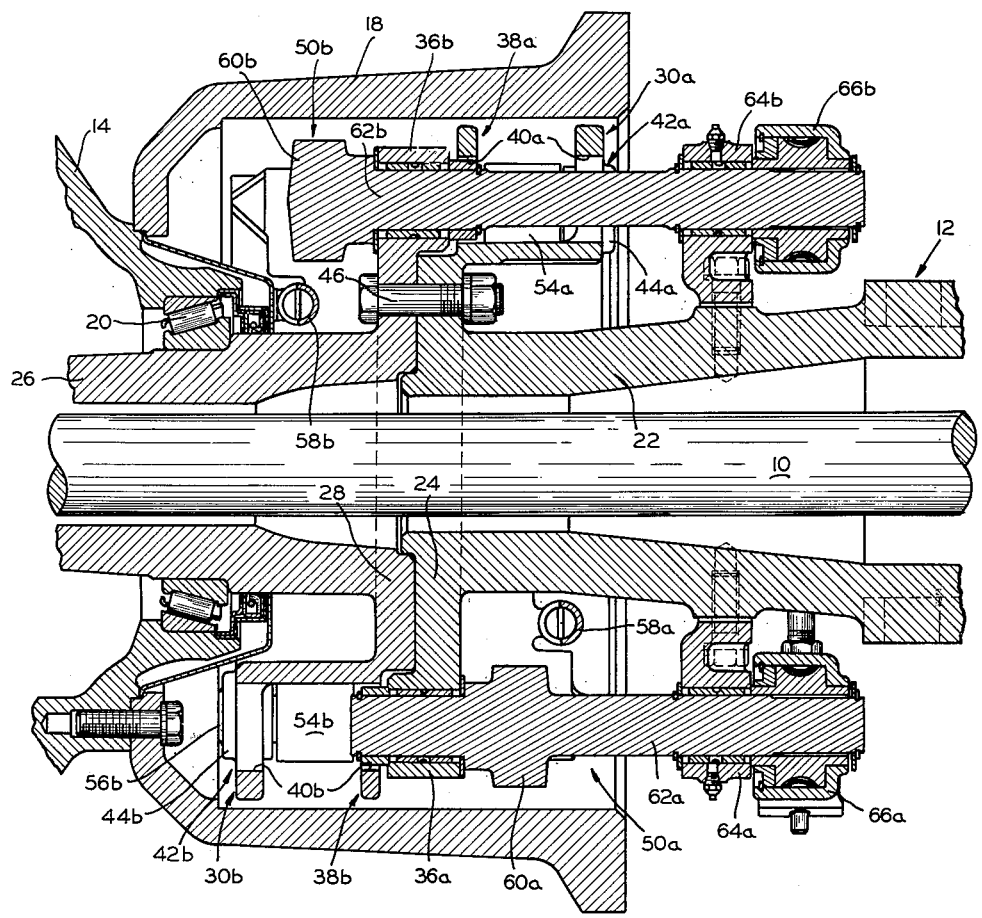

Figure 5 is a vertical section of the spider;

Figure 6 is a fragmentary vertical section of the axle assembly showing a modified mounting of the spiders; and Figure 7 is a fragmentary vertical section of a modified axle assembly wherein the spiders are formed integrally with the opposed flanges of the two parts of the axle housing.

Referring now to the drawings, and particularly to Figure 1, I have shown part of a vehicle drive axle embodying the double brake assembly of my invention. The drive axle assembly includes a rotatable axle 10, a stationary hollow housing 12 encircling the axle, a wheel hub 14 secured to and rotated by the axle, a tire rim 16 secured to the hub and a brake drum 18 secured to the hub and rotatable about the axle housing. The drum 18 is characterized by its relatively small diameter and somewhat greater length than is conventional.

The drum 18, as shown in Figure 2, comprises a hollow cylinder and is rotatably mounted by means of bearings 20 on housing 12. The housing 12 is comprised of an inboard part 22, normally an integral part of the differential housing, which terminates at its outboard end in a radial flange 24, and an outboard part 26 terminating at its inboard end in a like flange 28, the two flanges normally being bolted together to complete the housing.

According to the embodiment of my invention shown in Figure 2, I provide, to opposite sides of the flanges 24 and 28, a pair of spiders 30a and 30b which are identical, with the exception that the inboard spider 30a is split into two parts to accommodate fitting of the same around the inboard housing part 22. One of the spiders is shown in detail in Figures 4 and 5, wherein the dotted lines indicate the line of cut for dividing the inboard spider in two. As there shown, each spider comprises a metallic casting including an annular plate 32 adapted to encircle the axle housing and provided with spaced holes 34 for the passage of bolts or like fasteners. At the peripheral edge of the annular plate 32, each spider includes a first bearing portion 36 extending axially to one side of the plate and a bifurcated portion 38 extending to the opposite side of the plate at the portion of the plate diametrically opposite the first portion 36. The bifurcated portion 38 includes an enlarged axial bore 40 extending through both legs or bifurcations thereof at a point diametrically opposite the first bearing portion 36. To opposite sides of the bore 40, at equal circumferential spacings therefrom, the bifurcated portion 38 includes second bearing means 42 each comprised of axially aligned bearing portions 44 in the two bifurcations.

The above described components of the two spiders 30a and 30b are indicated in Figures 2 and 3 with the suffixes a and b, respectively, for purposes of clarity. As shown in those figures, the two spiders are mounted on the axle housing in inverted relation to one another, i.e., with the first bearing portions 36a and 36b thereof in diametrically opposed relation, and also with the first bearing portions extending toward one another, and overlying the flanges 24 and 28. In this position, the spiders are secured to the flanges and the flanges are secured together by a plurality of bolts 46 passing through the flanges and the annular plates of the spiders.

In an axle assembly having an integral rather than a two piece housing, with an integral flange rather than abutting flanges 24 and 28 as shown in Figure 2, the inboard spider 30a is preferably split as described for purposes of mounting the same to the inboard side of the flange. In two piece housings of the character described and shown, the spiders 30a and 30b may, as an alternative to the structure shown, be formed integral with the flanges 24 and 28, respectively, as shown in Fig. 7. In such case, as illustrated, the respective flange itself constitutes the annular portion 32 of the spider. As a further alternative in two piece housing assemblies of the type shown, the inboard spider 30a, rather than being split and disposed to the inboard side of the flanges, may simply be confined between the flanges 24 and 28 as shown in Figure 6, and at the same time the outboard spider 30b also may be confined between the flanges as shown in Figure 6 or it may be disposed to the outboard side of the flanges if desired. Except for the particular disposition of the spiders, the structures shown in Figs. 6 and 7 are substantially the same as that shown in Figures 1 to 5 and for this reason the same reference numerals have been employed in Figures 6 and 7 as in the other figures.

In all of the above described embodiments of the spiders and their assembly on the axle housing, the spiders define axially spaced mounting means within the brake drum for two sets of brakes 50a and 50b, respectively.

Each brake set comprises a pair of arcuate brake shoes 54a—54a and 54b—54b, respectively, each shoe being less than semi-circular in extent and having a radius of curvature equal substantially to that of the inner surface of the brake drum and each carrying a conventional brake lining. An anchor shaft 56a and 56b, respectively, is rotatably mounted adjacent its opposite ends in the bearing portions 44a and 44b of each of the second bearing means 42, each shaft carrying a brake shoe and pivotally mounting the same on the respective spider. To the sides of the axle opposite the pivotal mounting thereof, the shoes of each pair are interconnected by a tension spring 58a and 58b, respectively, which normally biases the shoes inwardly away from the brake drum. Between the juxtaposed opposite ends of the shoes thereof, each brake set includes an actuator cam 60a and 60b, respectively, carried by a rotatable shaft 62a and 62b, respectively, which shafts are rotatably mounted respectively in the first bearing portion 36a and 36b of the spider which anchors the respective pair of brake shoes. The shaft 62b of the outboard brake set extends axially through the bore 40a in the inboard spider and through the bearing portion 36b of the outboard spider, whereas the actuator shaft 62a of the inboard brake set is journaled directly in the bearing portion 36a of the inboard spider. Both shafts extend in spaced parallel relation to the axle 10 and to one another to the exterior of the brake drum, at which point the same are journaled in pillow blocks 64a and 64b, respectively, which are secured to the axle housing.

To the inboard side of the respective pillow block, each actuator shaft is splined for attachment thereto of a crank arm and piston rod assembly 66a and 66b, respectively, connecting the shaft to a pneumatic actuator 68a and 68b, respectively, for each brake set, the actuators being mounted by means of brackets 70a and 70b, respectively, on the axle housing. The operation of these actuators to effect independent actuation of the two brake sets will be obvious to those skilled in the art.

In the completed assembly, the two spiders 30a and 30b mount the two brake sets in compact relation to one another and afford the distinct advantage of simplicity and accuracy in mounting of the brakes. The shoes are firmly anchored by the spiders in spaced bearing portions and the actuator shafts are similarly mounted in accurate bearing supports. Due to the compact assembly, the length of the drum is maintained at a minimum. The spiders, being identical and assembled in a highly simplified manner, also assure economy of construction and facilitate maximum decrease in the diameter of the brake drum. In this respect it is also observed that the improved spiders accommodate use of identical brake shoes, anchor shafts, etc. Accordingly, the present invention affords a particularly compact and economical double brake assembly.

While I have shown and described what I regard to be the preferred embodiments of my invention, it will be appreciated that various changes, rearrangements and modifications may be made therein without departing from the scope of the invention, as defined by the appended claims.

I claim:

1. In a double brake assembly having two sets of brakes disposed in axially spaced relation and each including a pair of brake shoes and an actuator therefor, stationary spider means for mounting the brake sets including a pair of substantially diametrically opposed first bearing means and two pairs of second bearing means, the bearings of the two pairs of second bearing means being disposed equal distances to opposite sides of respective ones of said first bearing means, each pair of second bearing means rotatably anchoring the brake shoes of one brake set and the first bearing means opposite thereto journalling the actuator for said shoes, the bearing means of each pair of second bearing means being spaced circumferentially from the adjacent first bearing means to accommodate passage therebetween of the adjacent actuator, the axes of said first and second bearing means being disposed substantially on a common circle concentric with the axis of the assembly for maintaining a minimum diametric dimension of the assembly.

2. In a double brake assembly for wheeled vehicles having a stationary flanged axle housing, a brake drum rotatable about the housing and a pair of brake sets mounted in axially spaced relation on said housing within the drum, each set including a pair of opposed brake shoes pivotally mounted at a common set of ends and a rotatable actuator positioned between the other set of ends, the improvement comprising a pair of spider means carried by the flange on said housing, said spider means being substantially identical and each including an annular plate-like body, a first bearing portion extending radially outward of said body adjacent one edge thereof and a bifurcated portion extending radially outward of said body substantially diametrically opposite said first portion, the legs of said bifurcated portion having aligned openings therethrough at a point disposed diametrically opposite said first bearing portion and including two aligned bearing sets spaced equal circumferential distances to opposite sides of said openings, a brake shoe anchor shaft mounted in each of said bearing sets and pivotally mounting one of said brake shoes between the legs of said bifurcated portion, each brake shoe including a cylindrical bearing portion through which the respective anchor shaft extends, said spider means being inverted relative to one another with said bodies coaxial, said opening in each spider means aligned with the first bearing portion of the other spider means and the axes of all of said bearing portions, said bearing sets and said openings disposed on a common circle concentric with and slightly larger than the flange of the housing for maintaining a minimum diametric dimension of the assembly and the brake drum thereof, said first bearing portion of each spider means journalling therein the actuator for the brake shoes anchored on the respective spider means and the said opening in each spider means accommodating passage of the actuator for the brake shoes anchored on the other spider means, and actuating means for each of said actuators mounted on said housing.

3. In a double brake assembly as set forth in claim 2 wherein the axle housing is comprised of two parts, said parts including opposed flanges secured together, said spider means being formed integrally with respective ones of the flanges.

4. In a double brake assembly as set forth in claim 2 wherein the axle housing is comprised of two parts, said parts including opposed flanges secured together, said spider means comprising individual annular spiders, at least one of said spiders being disposed between the housing flanges, and the two flanges and the two spiders being secured together in abutting relation.

5. A double brake assembly comprising a flanged axle housing, a brake drum rotatably mounted on said housing, a pair of identical spider means carried by the flange of said housing within said drum, said spider means each including an annular plate-like body, a first radially outwardly and axially extending bearing portion and a bifurcated portion disposed substantially diametrically opposite said first bearing portion, said bifurcated portion extending radially outward from said body and projecting axially therefrom in the direction opposite said first bearing portion, said bifurcated portion including an opening therein at the point diametrically opposite said first bearing portion and two second bearing means each comprising axially aligned bearing portions in the bifurcations, said second bearing means being spaced equal distances circumferentially to opposite sides of said opening, said spider means being disposed coaxial and inverted relative to one another with the first bearing portions extending toward one another and the bifucated portions extending away from one another, an anchor shaft journaled in each of said second bearing means, an arcuate brake shoe anchored on each of said anchor shafts between said bifurcations whereby the two sets of brake shoes are disposed to opposite sides of said bodies, each brake shoe including a cylindrical portion through which the respective anchor shaft extends, each brake shoe being less than semi-circular in extent and having a radius of curvature equal substantially to that of the inner surface of said drum, a spring interconnecting the shoes mounted on each spider means and normally biasing the same inwardly out of engagement with said drum, an actuator shaft journaled in each of said first bearing portions in spaced parallel relation to the axis of said drum, each actuator shaft carrying a cam disposed between the free ends of the brake shoes anchored on the respective spider means, said actuator shaft extending axially to the exterior of said drum, and an actuator for each of said actuator shafts mounted on said housing to the exterior of said drum, the axes of said first bearing portions, said second bearing means, said actuator shafts and said anchor shafts lying substantially on a common circle concentric with said housing and only slightly larger than the flange of said housing and the peripheral surfaces of said brake shoes lying substantially on a circle concentric with and only slightly larger than the said common circle thereby to maintain the diameter of the assembly and of its brake drum at a minimum.

6. In a double brake assembly for wheeled vehicles having a stationary flanged axle housing, a brake drum rotatable about the housing and a pair of brake sets mounted in axially spaced relation on said housing within the drum, each set including a pair of opposed brake shoes pivotally mounted at a common set of ends and a rotatable actuator positioned between the other set of ends, the improvement comprising a pair of individual annular spiders carried by the flange on said housing, said spiders being substantially identical and each including a first bearing portion and a pair of second beairng portions spaced equal circumferential distances to opposite sides of a point diametrically opposite said first beairng portion, each pair of second bearing portions rotatably anchoring the brake shoes of one brake set and the first bearing portion of the respective spider journalling therein the actuator of the respective brake set, said spiders being inverted relative to one another with the first bearing portion of each spider disposed intermediate and in circumferentially spaced relation to the second bearing portions of the other spider, the axes of all of said bearing portions lying substantially on a common circle concentric with and slightly larger than the outer periphery of the flange of the housing for maintaining minimum diametric dimensions of the assembly and the brake drum thereof.

7. In a double brake assembly for wheeled vehicles having a stationary flanged axle housing, a brake drum rotatable about the housing and a pair of brake sets mounted in axially spaced relation on said housing within the drum, each set including a pair of opposed brake shoes pivotally mounted at a common set of ends and a rotatable actuator positioned between the other set of ends, the improvement comprising a pair of individual annular spiders carried by the flange on said housing, said spiders being substantially identical and each including a first bearing portion and a pair of second bearing portions spaced equal circumferential distances to opposite sides of a point diametrically opposite said first bearing portion, each pair of second bearing portions rotatably anchoring the brake shoes of one brake set and the first bearing portion of the respective spider journalling therein the actuator of the respective brake set, said spiders being inverted relative to one another with the first bearing portion of each spider disposed intermediate and in circumferentially spaced relation to the second bearing portions of the other spider, said spiders being mounted to opposite sides of the flange on the housing, the inboard one of said spiders being split to accommodate disposition of the same about the housing to the inboard side of the flange.

8. In a double brake assembly for wheeled vehicles having a stationary flanged axle housing, a brake drum rotatable about the housing and a pair of brake sets mounted in axially spaced relation on said housing within the drum, each set including a pair of opposed brake shoes pivotally mounted on a common set of ends and a rotatable actuator positioned between the other set of ends, the improvement comprising a pair of individual annular spiders carried by the flange on said housing, said spiders being substantially identical and each including an annular plate-like body, a first bearing portion extending radially outward of said body adjacent one edge thereof and a bifurcated portion extending radially outward of said body substantially diametrically opposite said first portion the legs of said bifurcated portion having aligned openings therethrough at a point disposed diametrically opposite said first bearing portion and including two aligned bearing sets disposed equal distances to opposite sides of said openings, said first bearing portion, said openings and said bearing sets being disposed substantially on a common circle concentric with said body, a brake shoe anchor shaft mounted in each of said bearing sets and pivotally mounting one of said brake shoes between the legs of said bifurcated portion, each brake shoe including a cylindrical bearing portion through which the respective anchor shaft extends, said spiders being inverted relative to one another with said bodies coaxial and said bifurcated portions extending axially in opposite directions, said spiders being mounted to opposite sides of the flange on the housing, the inboard one of said spiders being split to accommodate disposition of the same about the housing to the inboard side of the flange, said first bearing portions respectively journalling the actuator of the brake shoes anchored on the respective spider means, and actuating means for each of said actuators mounted on said housing.

References Cited in the file of this patent
UNITED STATES PATENTS

| 1,719,372 | Huck | July 2, 1929 |
|---|---|---|
| 2,103,750 | Kay | Dec. 28, 1937 |
| 2,287,009 | Alden | June 23, 1942 |
| 2,527,528 | Buckendale | Oct. 31, 1950 |